United States Patent
Koh et al.

(10) Patent No.: US 8,237,845 B2
(45) Date of Patent: Aug. 7, 2012

(54) METHOD AND APPARATUS FOR CONTROLLING A FOCUS LENS

(75) Inventors: Sung-shik Koh, Suwon-si (KR); Kazuhiko Sugimoto, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 12/468,187

(22) Filed: May 19, 2009

(65) Prior Publication Data
US 2010/0026879 A1    Feb. 4, 2010

(30) Foreign Application Priority Data
Jul. 31, 2008    (KR) .................. 10-2008-0075327

(51) Int. Cl.
*G03B 13/00* (2006.01)
*H04N 5/232* (2006.01)

(52) U.S. Cl. .............. 348/345; 348/349; 348/356

(58) Field of Classification Search ............ 348/345, 348/349, 356
See application file for complete search history.

(56) References Cited

U.S. PATENT DOCUMENTS

| | | | | |
|---|---|---|---|---|
| 5,361,095 A | * | 11/1994 | Toshinobu et al. | 348/354 |
| 2004/0130652 A1 | * | 7/2004 | Sasaki et al. | 348/349 |
| 2006/0291845 A1 | | 12/2006 | Sugimoto | |
| 2007/0064145 A1 | * | 3/2007 | Sugimoto | 348/345 |
| 2007/0269197 A1 | * | 11/2007 | Ide et al. | 396/125 |

FOREIGN PATENT DOCUMENTS
JP    06-082675 A    3/1994

* cited by examiner

*Primary Examiner* — Jordan Schwartz
(74) *Attorney, Agent, or Firm* — Drinker Biddle & Reath LLP

(57) ABSTRACT

Provided are a method of controlling a focus lens to be moved to a target location by generating a normalized focus graph by use of relative values of a plurality of focus values obtained by using a plurality of filters each having different cut-off frequencies, and predicting a target position of the focus lens according to the normalized focus graph, an apparatus operating by using the method, and a recording medium for recording the method. According to the present invention, in terms of performing an auto-focusing function, by optimizing the motion line of the focus lens, wasteful power consumption can be prevented and a scanning time of the focus lens can be shortened.

29 Claims, 14 Drawing Sheets

METHOD AND APPARATUS FOR CONTROLLING A FOCUS LENS

CROSS-REFERENCE TO RELATED PATENT APPLICATION

This application claims the benefit of Korean Patent Application No. 10-2008-0075327, filed on Jul. 31, 2008, in the Korean Intellectual Property Office, the disclosure of which is incorporated herein in its entirety by reference.

BACKGROUND OF THE INVENTION

1. Field of the Invention

The present invention relates to a method of controlling a focus lens which is movable within a predetermined range so as to focus the focus lens on a subject, and an apparatus for controlling the focus lens by using the method.

2. Description of the Related Art

Recently, digital photographing apparatuses with an autofocus function have been developed. The autofocus function performs focusing by analyzing image signals while moving a focus lens.

A focus lens is typically movable between the limits of a far position (for focusing on distant objects) and a near position (for focusing on near objects). Conventionally, the auto focus function is performed in several steps. First, the present position of the focus lens is determined, setting a close boundary position between the near and far position. Next, the focus lens is moved from the close boundary position to the far position. While the focus lens moves, the digital photographing apparatus captures and analyzes image signals. The target position for the focus lens is thereby determined.

There are disadvantages to this conventional method and apparatus for performing an auto-focus function. For example, even though a target position of the focus lens is not between the present position of the focus lens and the near position, if the present position of the focus lens is in closer proximity to the near position, then focus lens will be moved from near position to the far position in determining the target position. Although in principle the movement of the focus lens between the near position and the present position is unnecessary, conventionally the focus lens is moved through all possible positions. Unnecessary movement of the focus lens causes problems, such as wasteful power consumption and an increase in scanning time.

SUMMARY OF THE INVENTION

The present invention provides a method of controlling a focus lens so that the focus lens can be moved efficiently and rapidly, an apparatus operating by the method, and a recording medium having recorded thereon a program to execute the method.

According to an aspect of the present invention, there is provided a method of controlling a focus lens moving between a first position and a second position, the method including: deriving a normalized focus graph of a position of the focus lens versus a relative focus value; deriving a relative focus value corresponding to a present position of the focus lens; deriving at least one normalized focus graph including the present position of the focus lens and the relative focus value; predicting a target position of a focus lens which is focused on a subject from the derived normalized focus graph; and moving the focus lens to the target position.

The relative focus value may be a relative value of a first focus value according to a first filter having a first cut-off frequency versus a second focus value according to a second filter having a second cut-off frequency.

When the target position is positioned between the first position and the second position, the focus lens may be moved to the target position.

The target position may be a position of the focus lens corresponding to a maximum relative focus value or greatest relative focus value on the normalized focus graph.

When the relative focus value is represented as a percentage, the target position may be a position of the focus lens having a relative focus value of 100 of the normalized focus graph.

The method may further include determining a moving start position and a moving direction of the focus lens.

The method may further include performing a first determination of whether the target position is positioned between the first position and the second position, wherein as a result of the determination, when the target position is positioned between the first position and the second position, the moving start position and the moving direction may be determined as a present position of the focus lens and a direction toward the target position, respectively.

As a result of the first determination, when the target position is not positioned between the first position and the second position, the moving start position and the moving direction may be determined as a first position or second position, which is close to the present position, and a direction toward the first position or the second position that is different from the moving start position.

The method may further include performing a second determination of whether the present position is a central position between the first position and the second position, as a result of the first determination, when the target position is not positioned between the first position and the second position, wherein, as a result of the second determination, when the present position and the central position are equal, a moving start position and a moving direction are determined as the moving start position and the moving direction that are established by default, and as a result of the second determination, when the present position and the central position are not equal, the moving start position and the moving direction are determined as the first position or the second position, which is close to the present position, and a direction toward the first position or the second position that is different from the moving start position, respectively.

The method may include deriving a difference between the target position and the present position; performing a first determination of whether a value obtained by subtracting the difference from the present position is less than the first position; and as a result of the first determination, if the value is less than the first position, moving the focus lens from the present position to a second position.

As a result of the first determination, if the value is not less than the first position, the method may include performing a second determination of whether the present position is less than a central position between the first position and the second position; and as a result of the second determination, if the value is less than the first position, the method may include moving the focus lens from the first position to the second position.

As a result of the second determination, if the value is not less than the first position, the method may include moving the focus lens from the second position to the first position.

The method may include deriving a difference between the target position and the present position; performing a first determination of whether a value obtained by adding the difference to the present position is greater than a second position; and as a result of the first determination, if the value is greater than the second position, the method may include moving the focus lens from the present position to the first position.

As a result of the first determination, if the value is not greater than the second position, the method may include performing a second determination of whether the present position is greater than a central position between the first position and the second position; and as a result of the second determination, if the value is greater than the second position, the method may include moving the focus lens from the second position to the first position.

As a result of the second determination, if the value is not greater than the second position, the method may include moving the focus lens from the first position to the second position.

The method may include deriving a luminance signal from the present position of the focus lens; and when deviation of the luminance signal is greater than a reference value, the method may include controlling a relative focus value corresponding to the present position of the focus lens to be derived.

According to another aspect of the present invention, there is provided a computer readable recording medium having embodied thereon a computer program for executing the method of any one of the methods of controlling a focus lens.

According to another aspect of the present invention, there is provided an apparatus for controlling a focus lens to be moved from a first position to a second position, the apparatus including: a relative focus value derivation unit deriving a relative focus value from a present position of the focus lens; a normalized focus graph derivation unit deriving at least one normalized focus graph including the present position of the focus lens and the relative focus value; a target position derivation unit deriving a target position of the focus lens which is focused on a subject from the normalized focus graph; and a focus lens movement control unit for controlling the focus lens to be moved to the target position.

The apparatus may further include a memory storing the normalized focus graph of a position of the focus lens versus a relative focus value.

The relative focus value may be a relative value of a first focus value according to a first filter having a first cut-off frequency versus a second focus value according to a second filter having a second cut-off frequency.

The apparatus may include a first focus value derivation unit deriving the first focus value; and a second focus value derivation unit deriving the second focus value.

The apparatus may further include a moving information determination unit for determining at least one item of information from among a moving start position and a moving direction so as to move the focus lens to the target position.

The moving information determination unit may include: a first determination unit for performing a first determination of whether the target position is positioned between the first position and the second position; as a result of the first determination by the first determination unit, when the target position is positioned between the first position and the second position, a moving start position determination unit for determining a moving start position as the present position; and as a result of the first determination by the first determination unit, when the target position is positioned between the first position and the second position, a moving direction determination unit for determining a moving direction as a direction toward the target position.

The apparatus may further include a second determination unit for determining a second determination of whether the present position is a central position between the first position and the second position; as a result of the first determination by the first determination unit, when the target position is not positioned between the first position and the second position; and as a result of the second determination by the second determination unit, when the present position is not the central position, the moving start position determination unit for determining the moving start position as a first position or second position that is close to the present position; and as a result of the first determination by the first determination unit, when the target position is not positioned between the first position and the second position, and as a result of the second determination by the second determination unit, when the present position is not the central position, the moving direction determination unit for determining the moving direction as a direction toward a first position or second position that is different from the moving start position.

The moving information determination unit may include: a difference derivation unit for deriving a difference between the target position and the present position; a first determination unit for determining whether a value obtained by adding the difference to the present position is less than the first position; as a result of the determination by the first determination unit, when the value is less than the first position, a moving start position determination unit for determining a moving start position of the focus lens as the present position; and as a result of the determination by the first determination unit, when the value is less than the first position, a moving direction determination unit for determining a moving direction of the focus lens as a direction toward the second position.

The apparatus may further include a second determination unit for determining whether the present position is less than a central position between the first position and the second position, wherein, as a result of the determination by the first determination unit, when the value is not less than the first determination unit, and as a result of the determination by the second determination unit, when the value is less than the first determination unit, the moving start position determination unit determines the first position as a moving start position of the focus lens, and the moving direction determination unit determines the second position as a moving direction of the focus lens, and as a result of the determination by the first determination unit, when the value is not less than the first determination unit, and as a result of the determination by the second determination unit, when the value is not less than the first determination unit, the moving start position determination unit determines the second position as a moving start position of the focus lens, and the moving direction determination unit determines a direction toward the first position as a moving direction of the focus lens.

The apparatus may further include a luminance deviation derivation unit for deriving deviation of a luminance signal in the present position of the focus lens.

The apparatus may further include a luminance deviation determination unit for comparing deviation of the luminance signal with a reference value.

When deviation of the luminance signal is greater than the reference value, the luminance deviation determination unit may output a control signal for controlling the relative focus value derivation unit so as to derive a relative focus value corresponding to the present position of the focus lens.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now exemplary embodiments in accordance with the present invention will be described in detail with reference to the accompanying drawings.

According to the present invention, a target position of a focus lens is predicted using a normalized focus graph, so that the focus lens can be rapidly moved to the target position. An embodiment of the process for deriving a normalized focus graph is described with reference to FIGS. 1 through 8.

Figure 1:
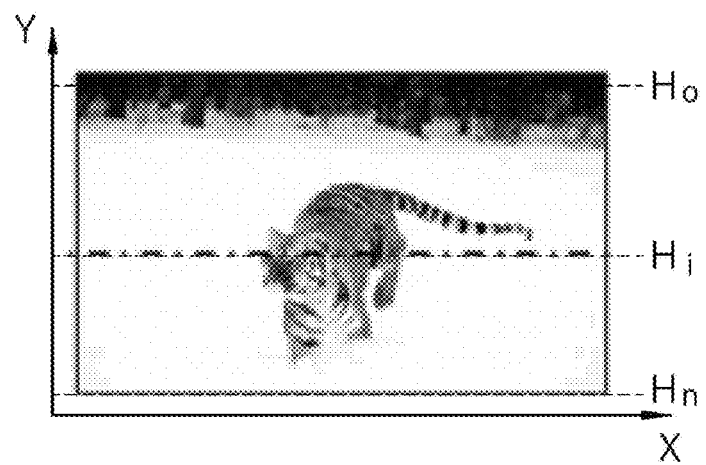
FIGS. 1 and 3 illustrate a first image and a first luminance signal derived from the first image according to an embodiment of the present invention.
Figure 2:
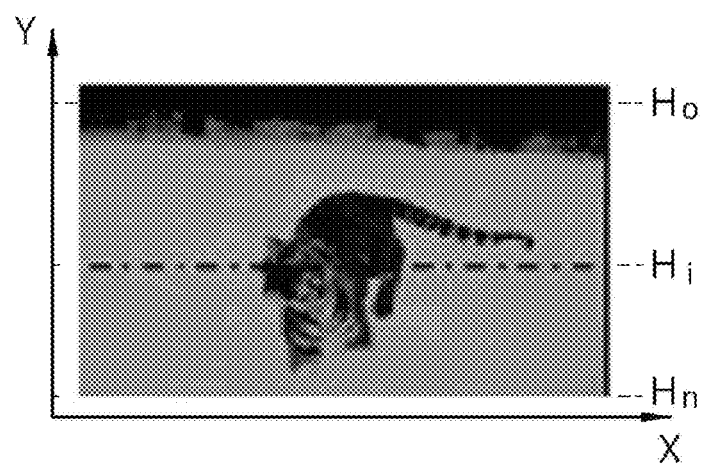
FIGS. 2 and 4 illustrate a second image and a second luminance signal derived from the second image according to an embodiment of the present invention.

FIG. 1 is a first image of a subject (a tiger) and is a relatively bright image. FIG. 2 is a second image of the subject and is a relatively dark image compared to the first image of FIG. 1. That is, the first image has a high luminance level and the second image has a low luminance level.

Figure 3:
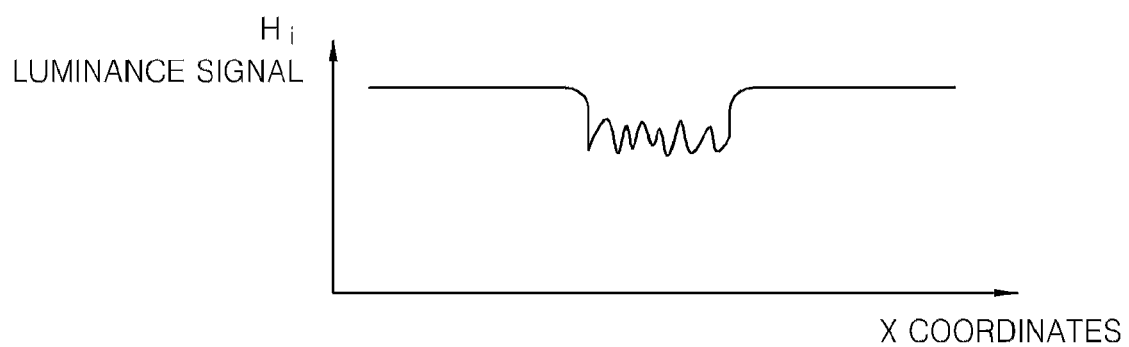
Figure 4:
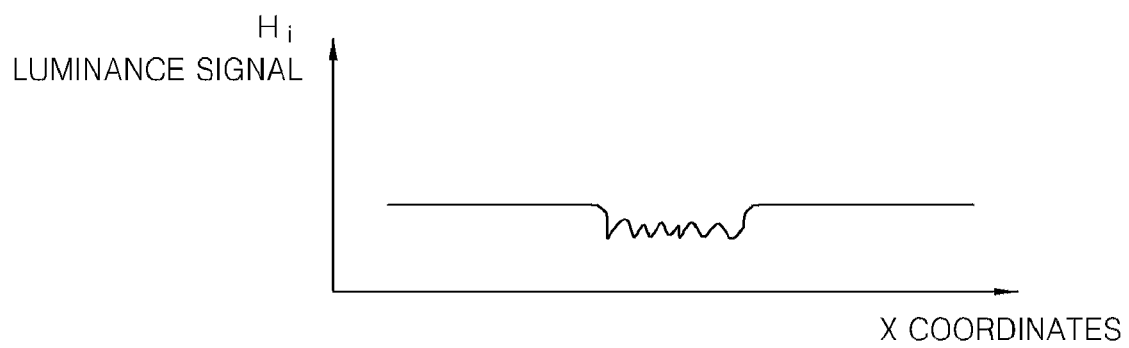

In detail, FIG. 3 is a graph showing a luminance signal of a Hi line in the first image, and FIG. 4 is a graph showing a luminance signal of a Hi line in the second image. Comparing the two graphs, the luminance level of the first image is higher than that of the second image in general.

Since the images shown in FIGS. 3 and 4 have different luminance levels, even with the focus lens in the same position, their focus values are different. Accordingly, it is difficult to determine whether an image is in-focus or out of focus using a single measurement of focus value.

In the current embodiment, an in-focus or defocused state of an image is determined using a relative focus value. More specifically, starting from the luminance signal of each line in an image (like the luminance signal lines shown in FIGS. 3 and 4), a first focus value is derived by filtering and integrating a higher frequency component above a first cut-off frequency, and a second focus value is derived by filtering a luminance signal and integrating a lower frequency component at a second cut-off frequency. The same derivations of first and second focus values may be performed also on a second image. The first focus value and the second focus value according to the focus lens are thereby derived for each image.

Figure 5:
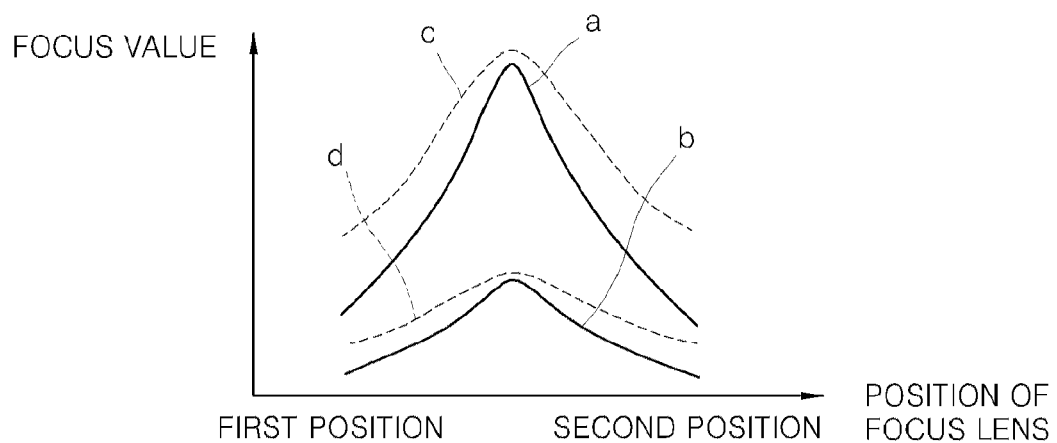
FIG. 5 shows plots of curves representing a first set of focus values and a second set of focus values according to an embodiment of the present invention.

Referring to FIG. 5, the first focus values and the second focus values for the first image are represented by solid lines a and b, respectively. Similarly, the first focus values and the second focus values for the second image are represented by dotted lines c and d, respectively. FIG. 5 thus illustrates on embodiment of how the first focus values and the second focus values are produced by filtering and integrating at different cut-off frequencies the first image and the second image.

Figure 6:
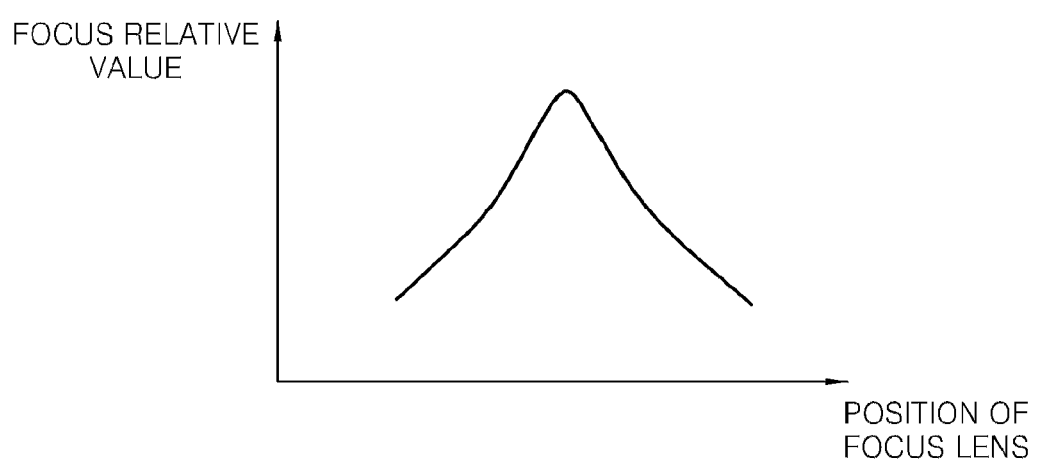
FIG. 6 shows a plot of a curve representing normalized focus values according to an embodiment of the present invention.
Figure 7:
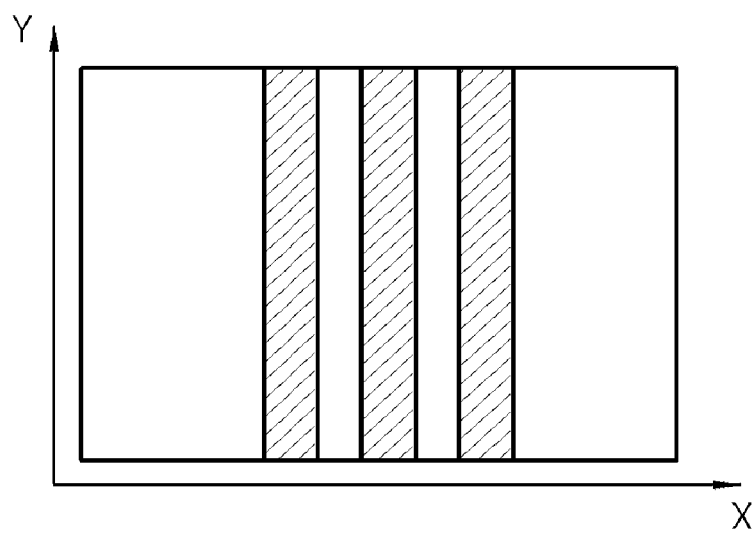
FIG. 7 illustrates an image with relatively many edges, which may be used for obtaining the normalized focus values according to an embodiment of the present invention.
Figure 8:
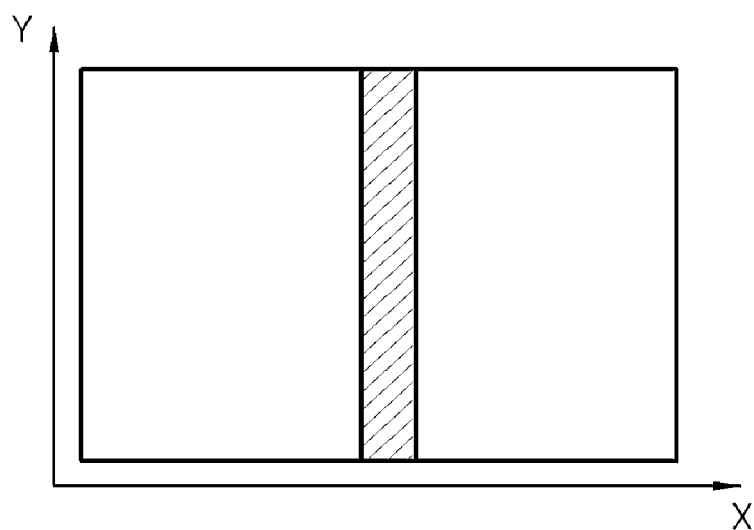
FIG. 8 illustrates an image with relatively few edges, which may be used in conjunction with an image like the one illustrated in FIG. 7 according to an embodiment of the present invention.

FIG. 6 illustrates an example of how the relative value of the first focus value versus the second focus value may be derived. The graph of FIG. 6 is derived from a combination of the first focus values and the second focus values shown in FIG. 5. Accordingly, a normalized focus graph of the relative focus value versus the position of the focus lens may be obtained.

Using a plurality of focus values (each representing an absolute focus value) derived from an image having many edges (such as the image illustrated in FIG. 7) and an image having few edges (such as the image illustrated in FIG. 8), plurality of focus values may be combined into a normalized relative focus value. In an embodiment, different luminance levels may also be combined into a normalized relative focus value curve. In an embodiment, a normalized focus graph (of the kind shown in FIG. 6) is obtained by using various images and performing experiments repetitively.

Figure 9:
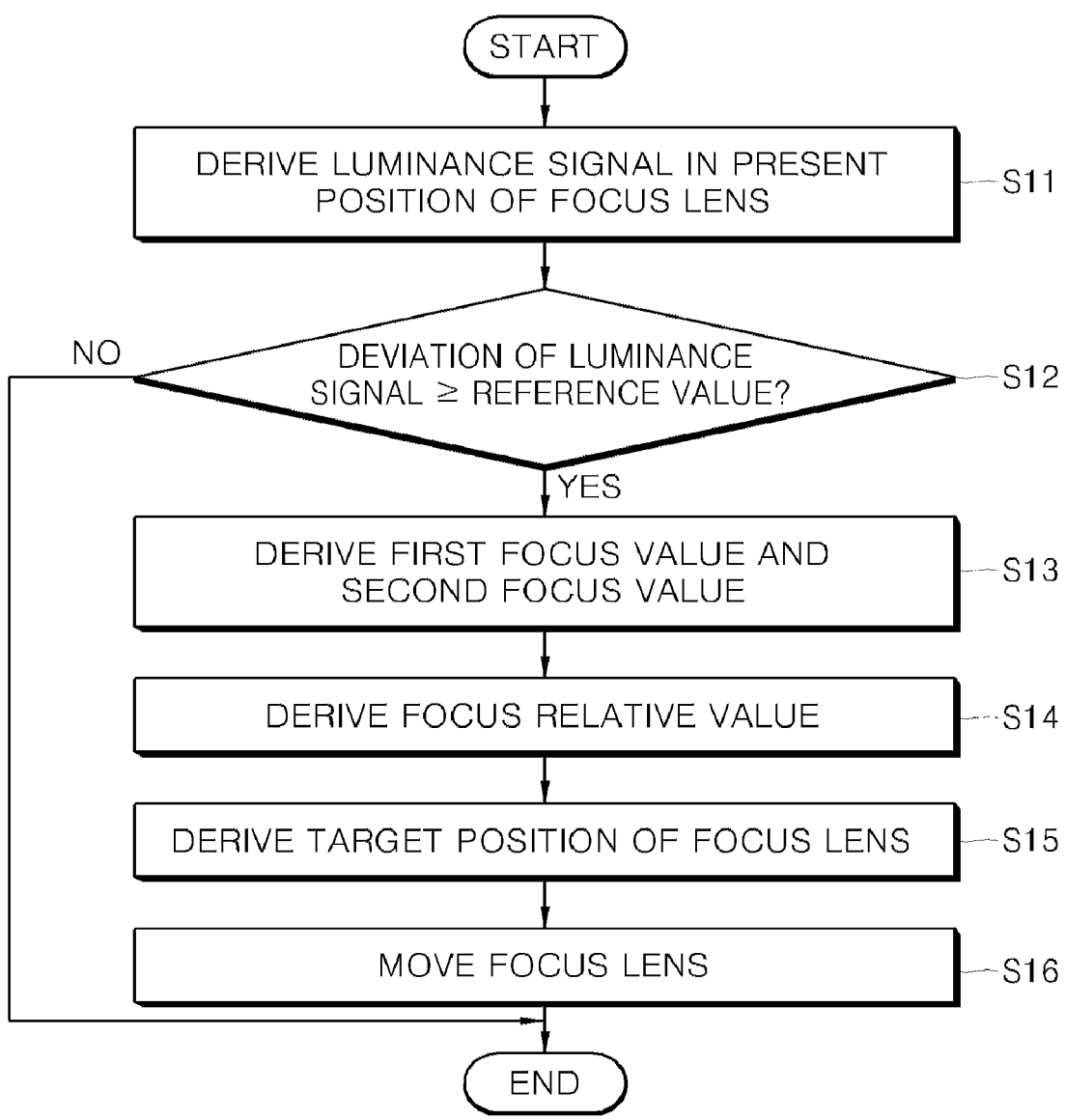
FIG. 9 is a flowchart for explaining a method of controlling a focus lens, according to an embodiment of the present invention.

After the normalized focus graph of the relative focus value versus the position of the focus lens has been derived, the focus lens may be rapidly moved to a target position by analyzing images with reference to the normalized focus graph. More specifically, a method of controlling a focus lens according to an embodiment of the present invention is described with reference to FIG. 9.

First, a luminance signal is derived in a present position of the focus lens (S11). Then, the size of a deviation of the luminance signal is determined, that is, whether the deviation of the luminance signal is greater than a predetermined reference value (S12). Whether the deviation of the luminance signal is the same as the reference value is also determined in this step. The deviation of the luminance signal from the predetermined reference value may be determined using various units, such as width of the standard deviation of the luminance signal, or size of the adjacent area under the luminance signal. This step is useful for determining whether a subject exists or not. If a subject does not exist (i.e., if a high-frequency luminance signal is not detected), then a process for predicting a target position of the focus lens may be unnecessary. The focus lens may be moved using a conventional method without performing the process for predicting the target position. Alternatively or in addition, the focus lens may not be moved at all.

Figure 10:
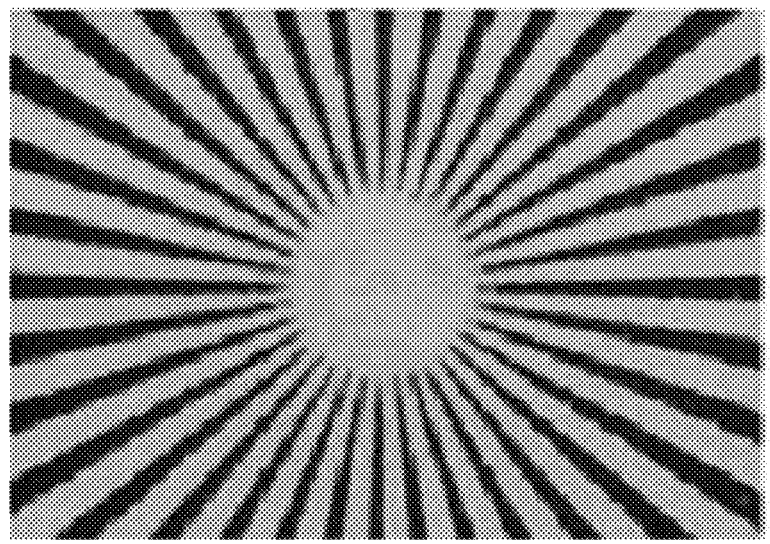
FIG. 10 shows an in-focus image.
Figure 11:
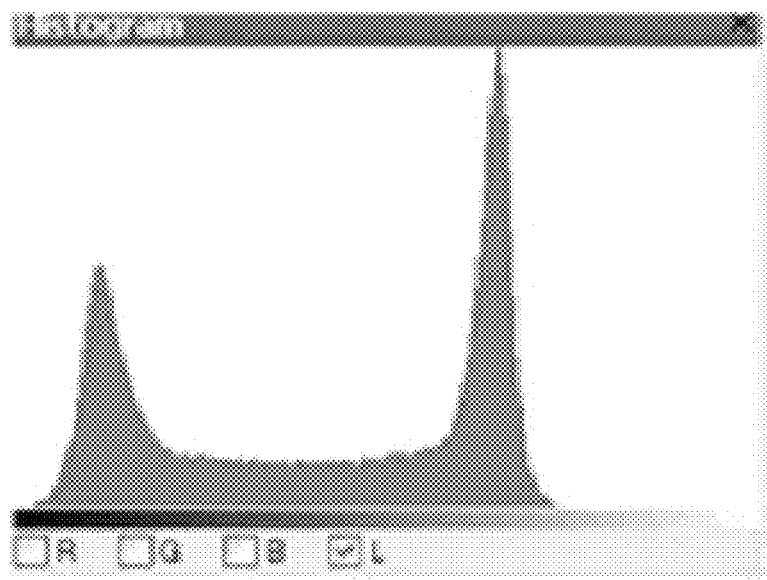
FIG. 11 a graph of the range of contrasts corresponding to the in-focus image of FIG. 10, both according to an embodiment of the present invention.
Figure 12:
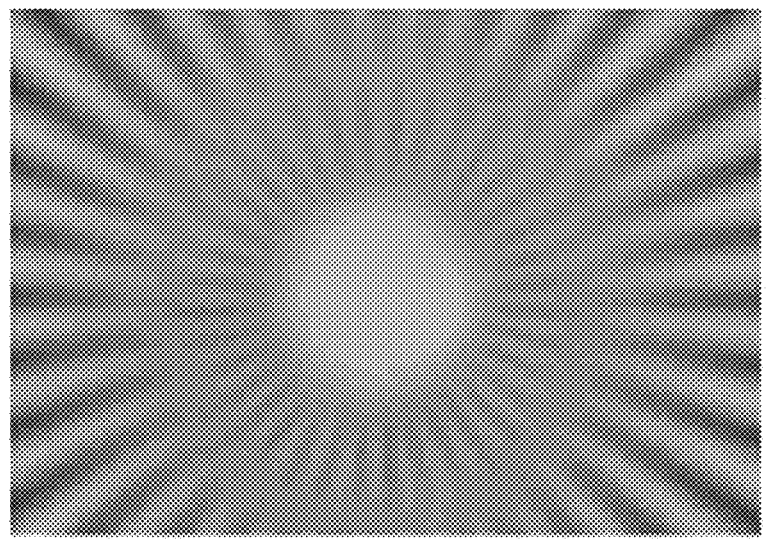
FIG. 12 shows a slightly out of focus image.
Figure 13:
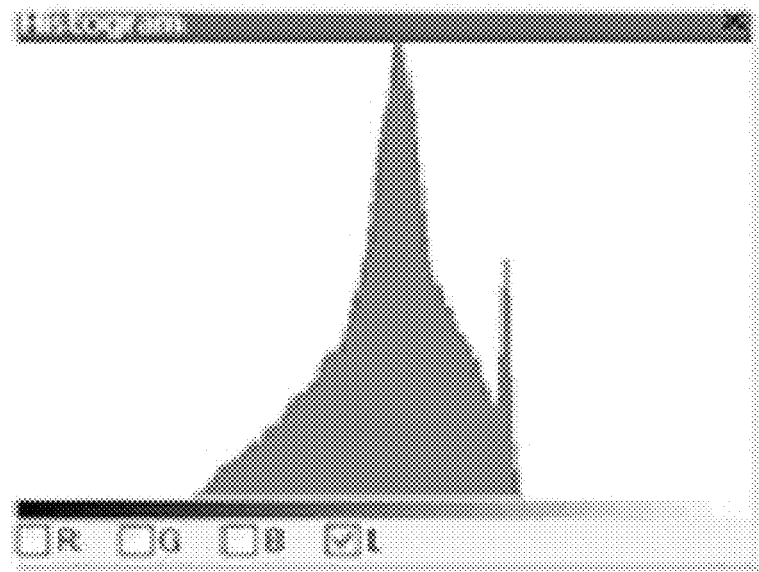
FIG. 13 a graph of the range of contrasts corresponding to the slightly out of focus image of FIG. 12, both according to an embodiment of the present invention.
Figure 14:
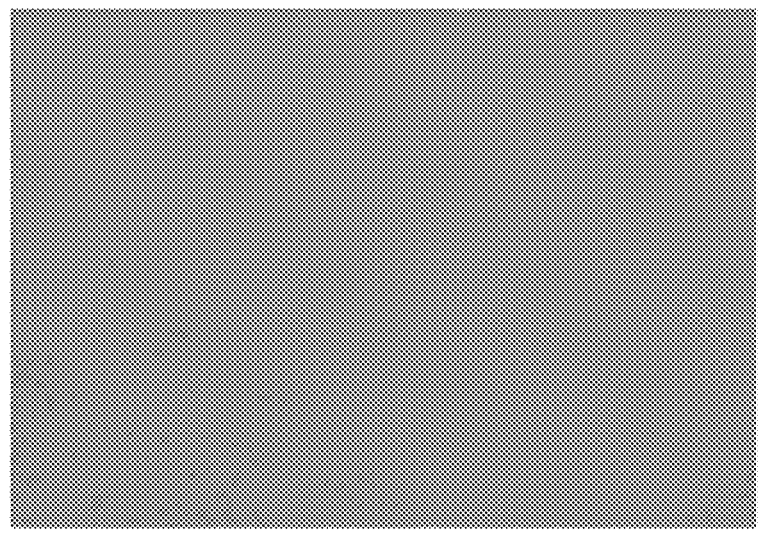
FIG. 14 shows an out of focus image.
Figure 15:
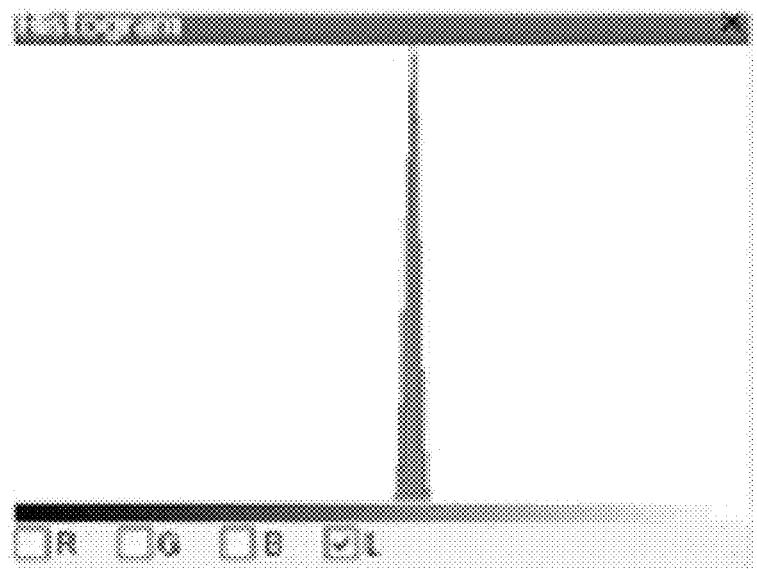
FIG. 15 a graph of the range of contrasts corresponding to the out of focus image of FIG. 14, both according to an embodiment of the present invention.

FIGS. 10 through 15 illustrate an example of how a target position of a focus lens is calculated according to an embodiment of the present invention. Each of FIGS. 10, 12, and 14 shows an image of a subject, successively more out of focus. In FIG. 10, the image of the subject is in focus. In FIG. 14, the image of the subject is out of focus. In FIG. 12, the image of the subject is between in-focus and out of focus. Each of FIGS. 11, 13, and 15 shows a histogram of the range of contrast associated with each of FIGS. 10, 12, and 14, respectively. As may be observed by comparison of these figures, an in-focus image generally has a wider range of contrasts. Conversely, a out of focus image has a relatively narrow range of contrasts.

By using a histogram, in the case of a low contrast, that is, in the case of a low luminance deviation, it may be determined that a subject does not exist. When the subject does not exist, a process for predicting a target position of the focus lens is unnecessary. Accordingly, it is determined whether a standard deviation (or other measure) of the luminance signal is greater than a predetermined reference value or not, by using a histogram.

Referring back to FIG. 9, when the deviation of the luminance signal is greater than the reference value, the method proceeds to the next step (S13). However, when the deviation of the luminance signal is less than the predetermined reference value, the method ends.

A first focus value and a second focus value are derived using the luminance signal (S13). The first focus value may be obtained by integrating a high frequency component obtained by applying a first cut-off frequency to the luminance signal. The second focus value may be obtained by integrating a high frequency component obtained by applying a second cut-off frequency, which is lower than the first cut-off frequency, to the luminance signal. The first focus value and the second focus value are absolute focus values for an image input in a present position of the focus lens.

After obtaining the absolute first and second focus values, in the next step a relative focus value is derived (S14). With the relative focus value, at least one normalized focus graph is derived from the present position of the focus lens and the relative focus value. The target position of the focus lens is then derived from the normalized focus graph (S15). The normalized focus graph may be stored in advance.

The target position may be a position of the focus lens corresponding to a maximum relative focus value or a greatest relative focus value in the normalized focus graph. Also, when the relative focus value of the normalized focus graph is represented as a percentage, the position of the focus lens may have a relative focus value of 100. Finally, the focus lens is moved to the target position (S16). In other embodiments, the method of controlling the focus lens may further include deriving the target position of the focus lens and then determining moving information by using the target position.

Hereinafter, a process for determining moving information will be described in detail in accordance with various embodiments of the present invention. In such embodiments, the moving information comprises a moving start position and a moving direction.

Figure 16:
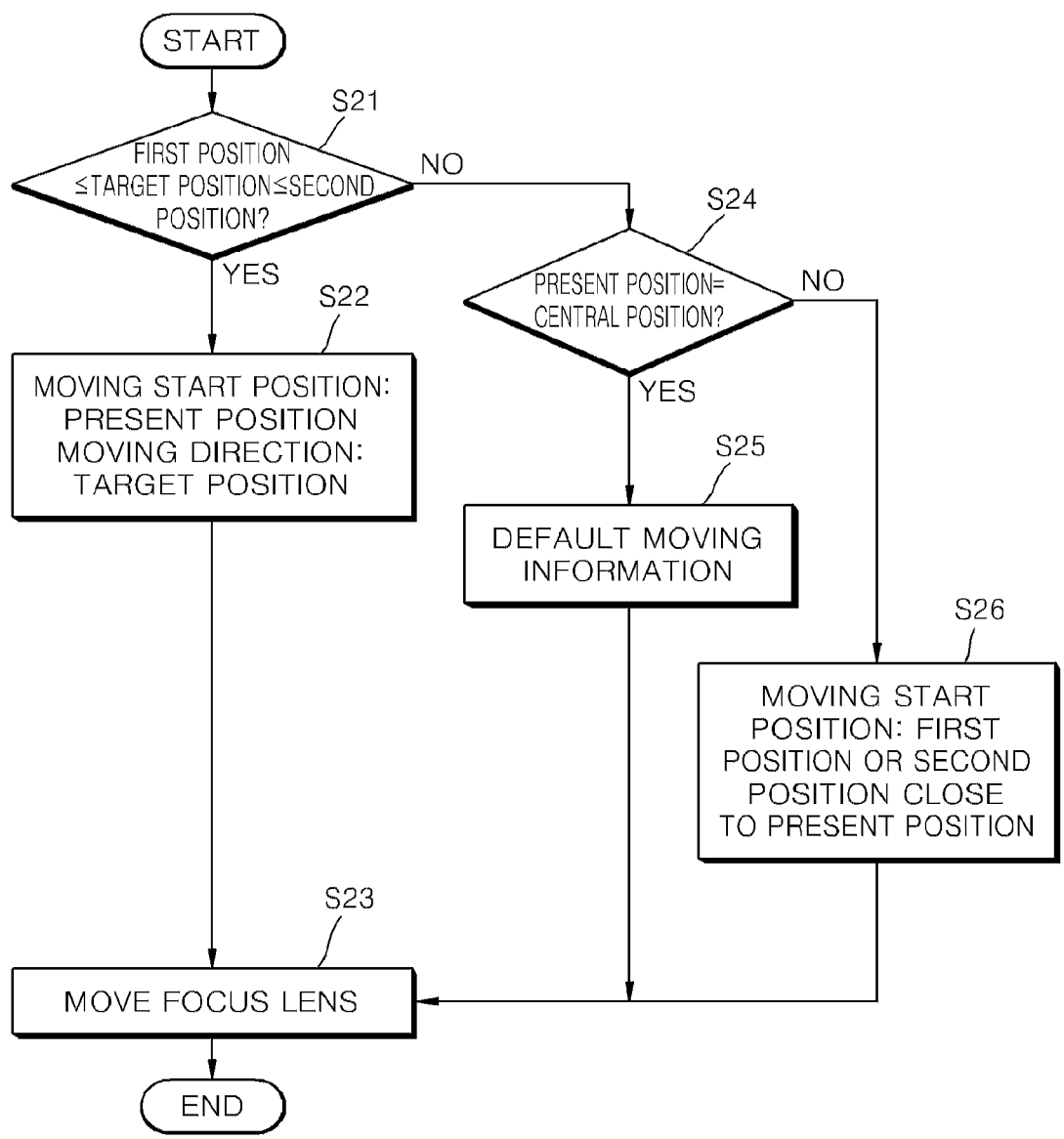
FIG. 16 is a flowchart showing a method of controlling a focus lens according to another embodiment of the present invention, and for explaining a process for determining moving information of the focus lens and moving the focus lens according to the moving information.

FIG. 16 is a flowchart showing a method of controlling a focus lens and for explaining a process for determining the moving information.

Referring to FIG. 16, after a target position is predicted and derived, it is determined whether the target position is within a range in which the focus lens is movable. More specifically, when the focus lens is moved between a first position and a second position, it is determined whether the target position is positioned between the first position and the second position (S21). In the context of these embodiments, the first position is a position of the focus lens where a subject exists at infinity, and the second position is a position of the focus lens where a subject exists at a near position.

If the target position is positioned between the first position and the second position, a moving start position is determined as a present position, and a moving direction is determined as a direction toward the target position (S22). Then, the focus lens is moved according to the moving information determined in step S21 (S23).

If the target position is not positioned between the first position and the second position, it is determined whether the present position of the focus lens is a central position (S24). Here, the central position denotes the center value between the first position and the second position.

When the target position and the central position are equal, default moving information is set (S25). The default moving information denotes a functional moving information set previously when it fails to determine the moving information. For example, if the focus lens is previously established to be moved from the first position to the second position, the moving start position may be the first position and the moving direction may be a direction toward the second position according to the default moving information. Then, the focus lens is moved according to the moving information established by default (S23).

If the target position and the central position are not equal, the moving start position may be determined as the first position or the second position that is close to the present position, and the moving direction may be determined as a direction toward the first position or the second position, which is different from the moving start position (S26). Then, the focus lens may be moved according to the determined moving information (S23).

If the target position is not positioned between the first position and the second position (i.e., is not positioned in a position where the focus lens is movable), then the focus lens is required to be moved through all possible positions between the first position and the second position. Accordingly, for the rapid movement of the focus lens, the first position or the second position that is close to the present position is determined, and the position of the focused focus lens may be searched while moving the focus lens from the close position to a boundary position that is different from the moving start position.

When there are a plurality of target positions between the first position and the second position, the method of controlling the focus lens may further include a method of preferentially scanning in a direction toward the target position, which is close to the present position, among the plurality of target positions, or a method of scanning in a direction toward the target position to which a priority order is manually or automatically given.

Figure 17:
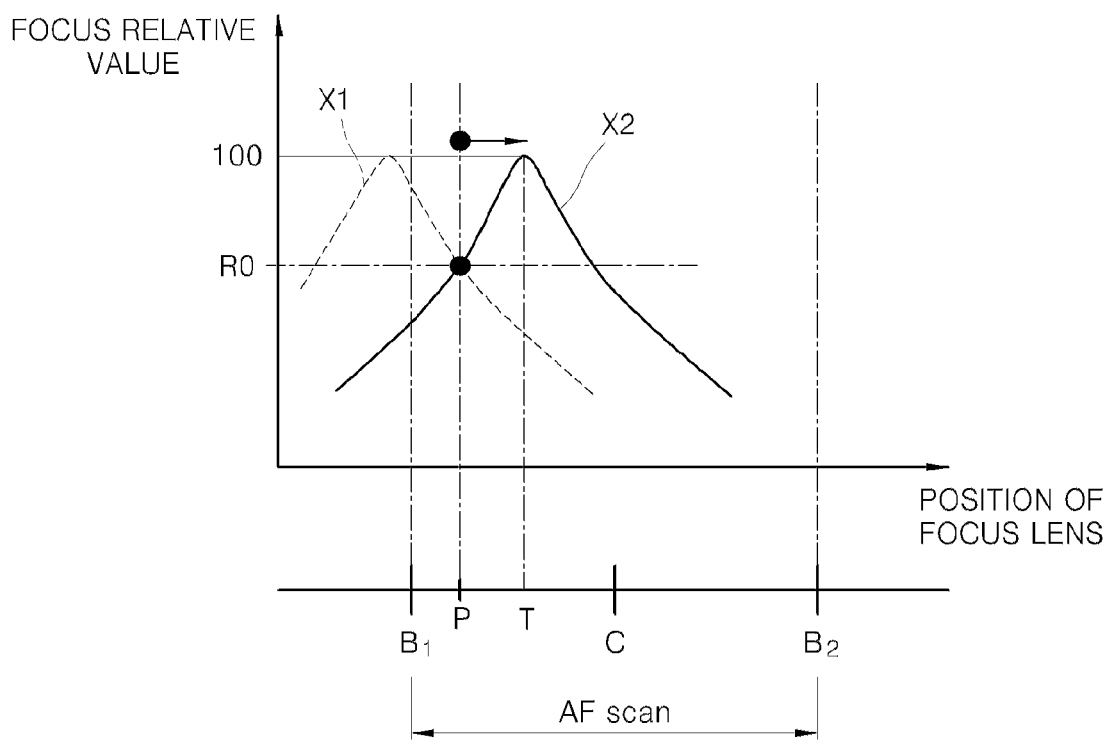
FIG. 17 is a graph for explaining a principle in which a focus lens moves according to the method of FIG. 16.

Hereinafter, an embodiment of the method of controlling the focus lens of FIG. 16 will be described with reference to FIG. 17. As shown in FIG. 17, the focus lens may be moved from a first position $B_1$ to a second position $B_2$ and is positioned in a present position P. A relative focus value R0 for the present position P of the focus lens is derived, so that a normalized focus graph including the present position P of the focus lens and the relative focus value R0 is obtained. In the current embodiment, first and second normalized focus graphs X1 and X2 may be obtained, and a target position T may be derived using the first and second normalized focus graphs X1 and X2. In the current embodiment, the position of the focus lens having the relative focus value of 100 is predicted as the target position T. The target position T of the first normalized focus graph X1 is not positioned between the first position $B_1$ and the second position $B_2$, but the target position T of the second normalized focus graph X2 is positioned between the first position $B_1$ and the second position $B_2$. The target position T of at least one of the first and second normalized focus graphs X1 and X2 may be positioned between the first position $B_1$ and the second position $B_2$.

When the target position T is positioned between the first position $B_1$ and the second position $B_2$, a moving start position and a moving direction may be determined as a present position P and a direction (→) toward the target position T, respectively. Then, the focus lens may be moved according to the determined moving start position and moving direction.

If the target position T is positioned between the first position $B_1$ and the second position $B_2$, it is determined whether the present position P and a central position C are equal or whether the present position P is greater than the central position C. If the present position P and the central position C are equal, the focus lens may be moved according to the default moving information established previously. If the present position P and the central position C are not equal, the focus lens may be moved from the first position $B_1$ or the second position $B_2$, which is close to the present position P, to the second position $B_2$ or the first position $B_1$.

Figure 18:
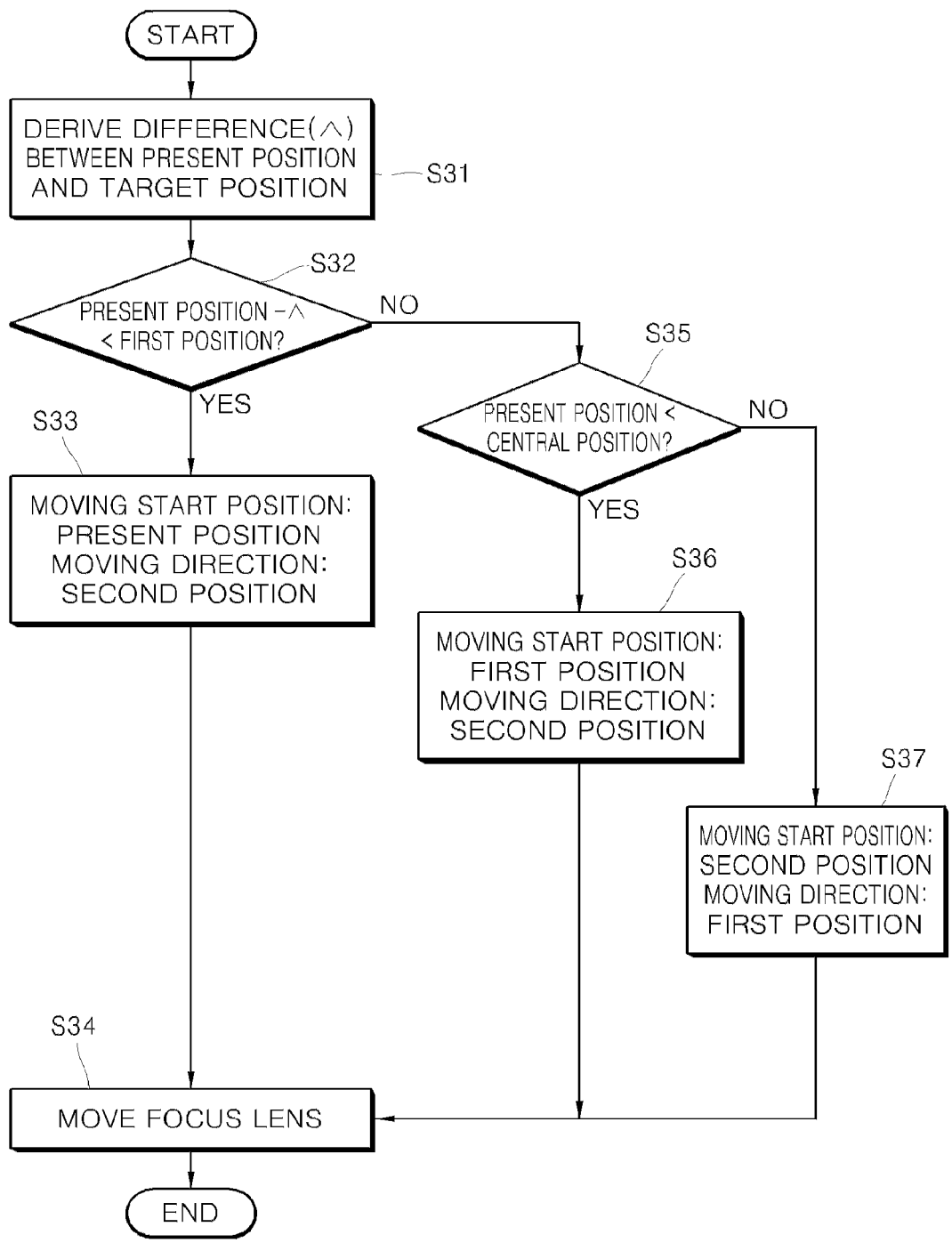
FIG. 18 is a flowchart showing a method of controlling a focus lens according to another embodiment of the present invention, and for explaining a process for determining moving information of the focus lens and moving the focus lens according to the moving information.

FIG. 18 is a flowchart showing a method of controlling a focus lens according to another embodiment of the present invention and for explaining a process for determining moving information. Referring to FIG. 18, after the target position is predicted and derived, a difference Δ between the present position and the target position of the focus lens is derived (S31). Then, it is determined whether a value obtained by subtracting the difference Δ from the present position is less than the first position (S32).

If the value is less than the first position, a moving start position and a moving direction may be determined as the present position and a direction toward the second position, respectively (S33). If the value is less than the first position, the target position is positioned in an area where the focus lens cannot scan. Accordingly, since searching for a focused position by moving the focus lens from the present position to a direction toward the first position is meaningless, the focus lens may scan in a direction toward the second position that is different from the first position. Then, the focus lens may be moved according to the determined moving start position and moving direction (S34).

If the value is not less than the first position, it is determined whether the present position of the focus lens is less than the central position C (S35). Here, the central position C denotes the center value between the first position and the second position as described above.

If the value is not less than the first position, the target position is positioned between the first position and the second position. Accordingly, the first position or the second position that is close to the present position of the focus lens is determined, and a motion line of the focus lens may be optimized by moving the focus lens from near to far.

If the present position is less than the central position, the moving start position and the moving direction may be determined as the first position, which is close to the present position of the focus lens, and a direction toward the second position that is different from the first position, respectively (S36). Then, the focus lens may be moved according to the determined moving start position and moving direction (S34).

If the value is not less than the present position and the present position of the focus lens is not less than the central position, the moving start position and the moving direction may be determined as the second position, which is close to the present position of the focus lens, and the first position that is different from the second position, respectively (S37). Then, the focus lens may be moved according to the determined moving start position and moving direction (S34).

Figure 19:
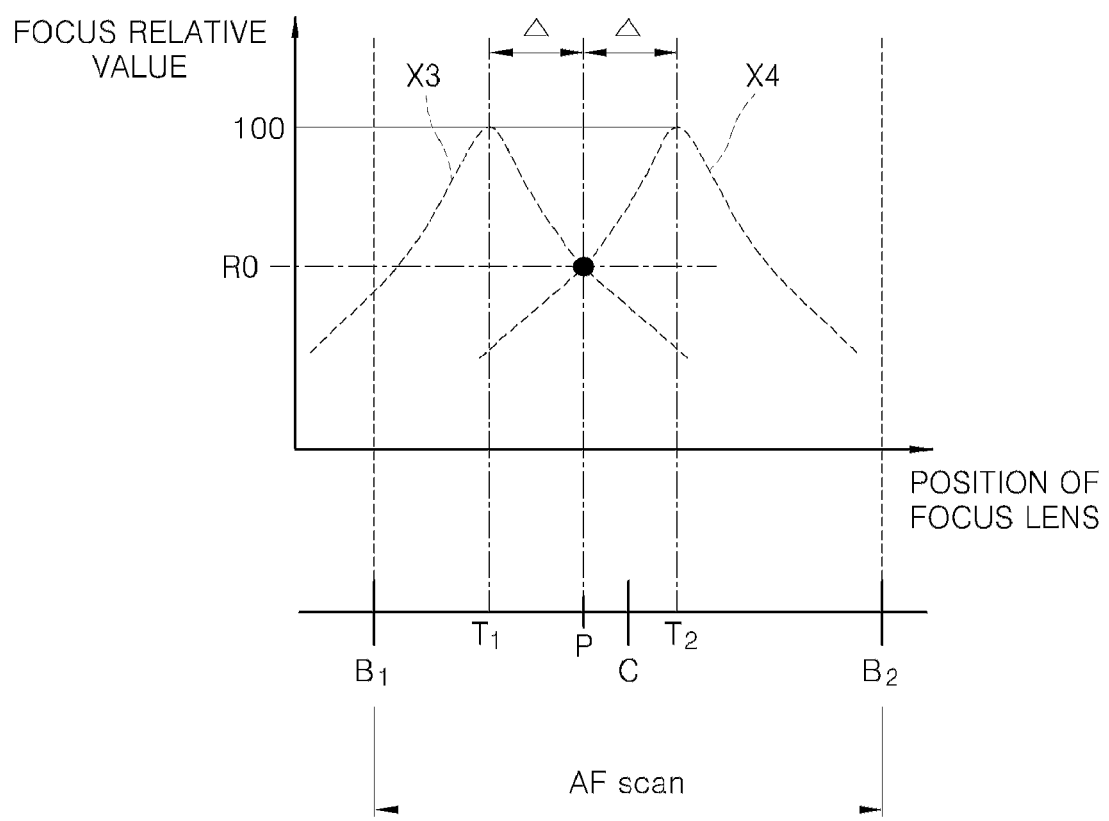
FIG. 19 is a graph for explaining a principle in which a focus lens moves according to the method of FIG. 18.

FIG. 19 is a graph for explaining a principle in which a focus lens moves according to the method of FIG. 18. Referring to FIG. 19, the focus lens may be moved from the first position $B_1$ to the second position $B_2$ and is located in the present position P. A relative focus value R0 versus the present position P of the focus lens is derived, so that a normalized focus graph including the present position P of the focus and the relative focus value R0 is derived. In the current embodiment, two normalized focus graphs X3 and X4 may be derived, and target positions $T_1$ and $T_2$ are predicted using the normalized focus graphs X3 and X4. In the current embodiment, a focus lens position having a relative focus value of 100 is predicted as a target position. Differences Δ between the present position P of the focus lens and each of the target positions $T_1$ and $T_2$ are derived. Then it is determined whether a value obtained by subtracting the difference Δ from the present position P is less than the first position $B_1$ or greater than the second position $B_2$. These examples are for determining whether the target positions $T_1$ and $T_2$ are positioned between the first position $B_1$ and the second position $B_2$. When the value is less than the first position $B_1$, the target positions $T_1$ and $T_2$ are positioned in an area not more than the first position $B_1$. When the value is greater than the second position $B_2$, the target positions $T_1$ and $T_2$ are positioned in an area exceeding the second position $B_2$. That is, if the value is less than the first position $B_1$ or greater than the second position $B_2$, it is determined that the target positions $T_1$ and $T_2$ are positioned in an area where the focus lens cannot scan. When it is determined that the target positions $T_1$ and $T_2$ are positioned in an area where the focus lens cannot scan, the moving start position may be determined as the present position P. Also, when the target positions $T_1$ and $T_2$ are positioned in an area not exceeding the first position $B_1$, the moving direction may be determined as a direction toward the second position $B_2$. Also, when the target position T is positioned in an area exceeding the second position $B_2$, the moving direction may be determined as a direction toward the first position $B_1$. When the target position T is positioned between the first position $B_1$ and the second position $B_2$, if the value is not less than the first position $B_1$ or not greater than the second position $B_2$, the first position $B_1$ or the second position $B_2$, which is close to the present position P, may be determined as the moving start position, and a direction toward the first position $B_1$ or the second position $B_2$, which are different from the moving start position, may be determined as the moving direction. The focus lens may be moved according to the determined moving start position and moving direction. If the target positions $T_1$ and $T_2$ are positioned between the first position $B_1$ and the second position $B_2$, it is determined whether the present position P and the central position C are equal or whether the present position P is greater than the central position C. If the present position P and the central position C are equal, the focus lens is moved according to moving information established by default. If the present position P and the central position C are not equal, the focus lens may be moved from the first position $B_1$ or the second position $B_2$, which is close to the present position P, to another second position $B_2$ or first position $B_1$.

In the current embodiment, when the value obtained by subtracting the difference Δ from the present position P is not less than the first position $B_1$ or not greater than the second position $B_2$, a process for determining whether the present position P and the central position are equal may be further included. As illustrated in FIG. 16, if the present position and the central position are equal, the focus lens may be moved according to moving information established by default.

In the aforementioned embodiments, the target position, the present position, or the value obtained by subtracting the difference Δ from the present position is compared with a reference value. However, the scope of the present invention must not be limited to a fact in that the value is high, low, the same, or the like. For example, in the flowchart of FIG. 16, S21 is the process for determining whether the target position is positioned between the first position and the second position, and the present invention must not be limited to determining whether the target position is within a range that is greater than the first position and less than the second position. Also, the present invention must not be limited to determining whether the target position is positioned between the first position and the second position is performed according to the equation shown in S21 of FIG. 16. The equation is an example of an embodiment of the present invention, and any equation capable of performing the above determination may be used. Furthermore, in terms of determining the target position in the above embodiment, the present invention may represent the equation in a different way. For example, in S32 of FIG. 18, it is determined that the value obtained by subtracting the difference Δ from the present position is less than the first position, but the present invention is not limited thereto. Thus, it may be determined that a value obtained by adding the difference Δ to the present position is greater than the second position. Also, the S35 may include determining whether the present position is greater than the central position in S35. That is, in order to perform comparison and determination as described in the present invention, the equation shown in S21 of FIG. 16 is an exemplary embodiment. The present invention may include any equation capable of performing the comparison and determination.

Also, in order for a practical industrial application of the aforementioned embodiments of the present invention to be successful, a proper margin may be considered. For example, when the present position is determined as the moving start position, instead of an accurate present position, a position obtained by subtracting or adding a predetermined margin value from or to the present position may be determined as the moving start position in consideration of a margin.

Figure 20:
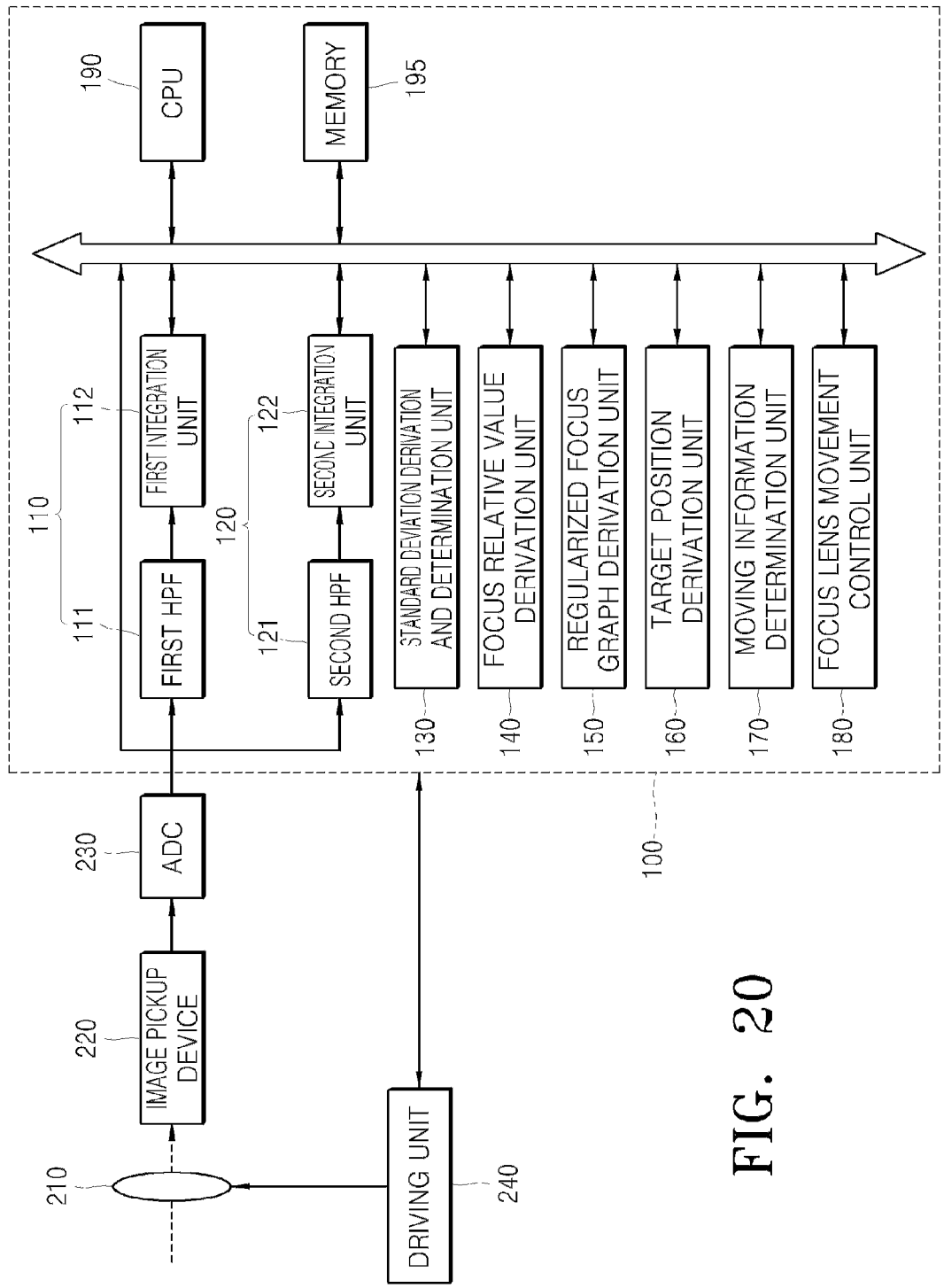
FIG. 20 is a block diagram illustrating an apparatus for controlling a focus lens according to an embodiment of the present invention.

FIG. 20 is a block diagram illustrating an apparatus for controlling a focus lens according to an embodiment of the present invention. Referring to FIG. 20, a control apparatus 100 controls movement of a focus lens 210.

The control apparatus 100 includes a first focus value derivation unit 110 and a second focus value derivation unit 120.

The first focus value derivation unit 110 includes a first high pass filter (HPF) 111 and a first integration unit 112. The first HPF 111 filters only a high frequency component according to a first cut-off frequency. The first integration unit 112 derives a first focus value by integrating the filtered high frequency component.

The second focus value derivation unit 120 includes a second HPF 121 and a second integration unit 122. The second HPF 121 filters a high frequency component by applying a second cut-off frequency that is different from the first cut-off frequency. The second integration unit 122 derives a second focus value by integrating the filtered high frequency component.

Light reflected from a subject reaches an image pickup device 220 through the focus lens 210. The image pickup device 220 converts a received light signal into an electrical signal and outputs the electrical signal to an analog-digital converter (ADC) 230. The ADC 230 digitizes the electrical signal. The digital signal including information about luminance may be called a luminance signal. The luminance signals input through the focus lens 210, which are positioned in a predetermined position, are respectively input to the first focus value derivation unit 110 and the second focus value derivation unit 120 to derive the first focus value and the second focus value.

A standard deviation derivation and determination unit 130 determines the existence of a subject by analyzing the luminance signal. In detail, the standard deviation derivation and determination unit 130 derives a luminance signal deviation, preferably, a standard deviation, to determine whether the standard deviation is greater than or exceeds a predetermined reference value. If the standard deviation is greater than or exceeds the predetermined reference value, it is determined that a subject to be focused on exists. Then, the standard deviation derivation and determination unit 130 controls the performance of later processes for moving the focus lens 210 by outputting a control signal corresponding to the determination.

A relative focus value derivation unit 140 obtains the first focus value and the second focus value from the first focus value derivation unit 110 and the second focus value derivation unit 120 respectively, and derives their relative values. The relative focus value derivation unit 140 may derive a relative value of the first focus value versus the second focus value.

A normalized focus graph derivation unit 150 derives at least one normalized focus graph including a present position of the focus lens 210 provided from the driving unit 240 and the derived relative focus value.

A target position derivation unit 160 predicts a target position from the normalized focus graph. The target position may be a position corresponding to a maximum point or greatest point on the normalized focus graph or a position of the focus lens corresponding to a relative focus value of 100 when the relative focus value is represented as a percentage.

A focus lens movement control unit 180 may control the driving unit 240 so as to move the focus lens according to the target position. After a moving information determination unit 170 determines moving information, such as a moving start position or a moving direction, by using the target position, the focus lens movement control unit 180 may control the movement of the focus lens according to the moving information.

The focus lens control apparatus 100 includes a central processing unit (CPU) 190, which controls the whole components, and a memory 195 for temporarily storing data, operation results, etc. that are required to operate the components used to move the focus lens.

The moving information determination unit 170, which is one of the above components, will now be described in detail.

Figure 21:
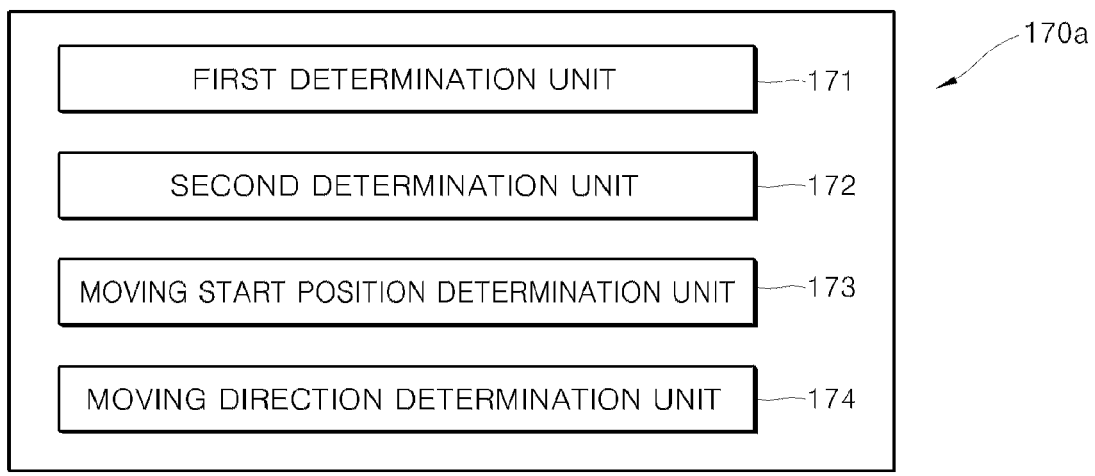
FIG. 21 is a block diagram illustrating an example of a moving information determination unit of the apparatus of FIG. 20, according to an embodiment of the present invention.
Figure 22:
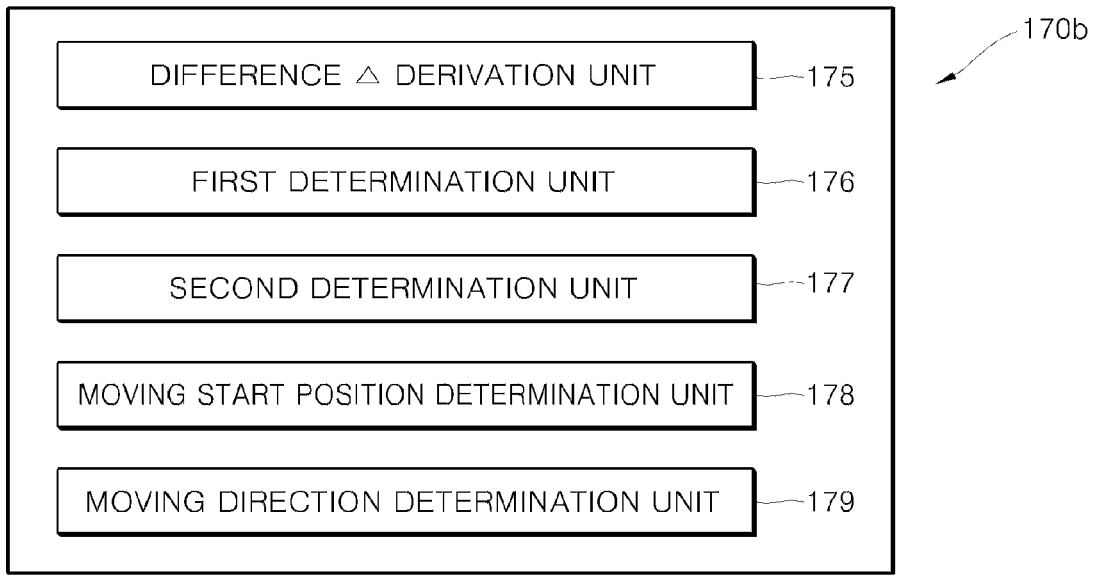
FIG. 22 is a block diagram illustrating another example of a moving information determination unit of the apparatus of FIG. 20, according to another embodiment of the present invention.

A moving information determination unit 170a is an embodiment of the moving information determination unit 170, and referring to FIG. 21, may include a first determination unit 171, a second determination unit 172, a moving start position determination unit 173, and a moving direction determination unit 174.

The first determination unit 171 determines whether the target position is positioned between a first position and a second position, that is, whether it is positioned at a boundary where the focus lens is movable.

The second determination unit 172 determines whether a present position of the focus lens and a central position are equal. Here, the central position denotes the center between the first position and the second position. The central position may be not only a specific position, but also a position located in a predetermined range including a predetermined margin in consideration of industrial use.

As a result of determination by the first determination unit 171, when the target position is positioned between the first position and the second position, the moving start position determination unit 173 determines a moving start position as the present position, and the moving direction determination unit 174 determines a moving direction as a direction toward the target position.

As a result of determination by the first determination unit 171, when the target position is not positioned between the first position and the second position, the second determination unit 172 determines whether the present position and the central position are equal. As a result of determination by the second determination unit 172, when the present position and the central position are equal, the moving start position determination unit 173 and the moving direction determination unit 174 use information established by default.

As a result of determination by the second determination unit 172, when the present position and the central position are not equal, the moving start position determination unit 173 determines a moving start position as the first position or the second position, which is close to the present position of the focus lens, and the moving direction determination unit 174 determines a moving direction as a direction toward the first position or the second position that is different from the moving start position. For example, if the moving start position determination unit 173 determines the moving start position as the first position, the moving direction determination unit 174 may determine the moving direction as a direction toward the second position.

A moving information determination unit 170b is another embodiment of the moving information determination unit 170 of FIG. 20, and may include a difference Δ derivation unit 175, a first determination unit 176, a second determination unit 177, a moving start position determination unit 178, and a moving direction determination unit 179.

The difference Δ derivation unit 175 derives a difference between the predicted target position and the present position.

The first determination unit 176 determines whether a value obtained by subtracting the difference Δ from the present position is less than the first position. Also, the first determination unit 176 may determine whether a value obtained by adding the difference Δ to the present position is greater than the second position.

The second determination unit 177 may determine whether the present position of the focus lens is less than the central position.

As a result of determination by the first determination unit 176, when the value obtained by subtracting the difference Δ from the present position is less than the first position, the moving start position determination unit 178 may determine a moving start position as the present position, and the moving direction determination unit 179 may determine a moving direction as a direction toward the second position. Also, as a result of determination by the first determination unit 176, when the value obtained by adding the difference Δ to the present position is greater than the second position, the moving start position determination unit 178 may determine the present position as the moving start position, and the moving direction determination unit 179 may determine a direction toward the first position as the moving direction.

As a result of determination by the first determination unit 176, when the value obtained by subtracting the difference Δ from the present position is less than the first position or when the value obtained by adding the difference Δ to the present position is greater than the second position, the second determination unit 177 determines whether the present position is less than the central position.

As a result of determination by the second determination unit 177, if the present position is less than the central position, the moving start position determination unit 178 determines the moving start position as the first position close to the present position, and the moving direction determination unit 179 determines the moving direction as a direction toward the second position that is different from the moving start position.

Also, as a result of determination by the second determination unit 177, if the present position is not less than the central position, the moving start position determination unit 178 determines the moving start position as the second position closed to the present position, and the moving direction determination unit 179 determines the moving direction as a direction toward the first position that is different from the moving start position.

In the current embodiment, a third determination unit for determining whether the present position of the focus lens and the central position are equal may be further included. When they are equal, the moving start position determination unit 178 and the moving direction determination unit 179 may be determined as information established by default. On the contrary, when the present position of the focus lens and the central position are not equal, the determination may be performed by the second determination unit 177.

According to the present invention, a normalized focus graph is obtained using relative values of a plurality of focus values having different cut-off frequencies, and a target position of a focus lens is predicted according to the normalized focus graph. Thus the focus lens can be efficiently and rapidly controlled to be moved to the target position.

Accordingly, by optimizing the motion line of the focus lens, wasteful power consumption can be prevented and a scanning time of the focus lens can be shortened.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of controlling a focus lens moving between a first position and a second position, the method comprising:
   deriving a normalized focus graph of relative focus values versus positions of the focus lens;
   directly predicting an in-focus position of the focus lens that is focused on a subject from the normalized focus graph; and
   moving the focus lens directly to the predicted in-focus position.

2. The method of claim 1, wherein each of the relative focus values is a relative value of a first focus value at a corresponding position of the focus lens according to a first filter having a first cut-off frequency versus a second focus value at the corresponding position of the focus lens according to a second filter having a second cut-off frequency.

3. The method of claim 1, further comprising moving the focus directly to the in-focus position when the in-focus position is between the first position and the second position.

4. The method of claim 1, wherein the in-focus position is a position of the focus lens corresponding to a maximum relative focus value or a maximum relative focus value on the normalized focus graph.

5. The method of claim 1, wherein, when the relative focus values are represented as percentages, the in-focus position is a position of the focus lens having a relative focus value of substantially 100 percent.

6. The method of claim 1, further comprising determining a moving start position and a moving direction of the focus lens.

7. The method of claim 6, further comprising:
   determining whether the in-focus position is between the first position and the second position; and
   when the in-focus position is between the first position and the second position, determining the moving start position and the moving direction to be a present position of the focus lens and a direction toward the in-focus position, respectively.

8. The method of claim 7, further comprising, when the in-focus position is not between the first position and the second position, determining the moving start position to be the first position or the second position that is closest to the present position, and the moving direction to be a direction toward the first position or the second position that is different from the moving start position.

9. The method of claim 7, further comprising:
   when the in-focus position is not positioned between the first position and the second position, determining whether the present position substantially corresponds to a central position between the first position and the second position;
   when the present position substantially corresponds to the central position, determining the moving start position and the moving direction to be a default moving start position and a default moving direction; and
   when the present position does not substantially correspond to the central position, determining the moving start position to be the first position or the second position that is closest to the present position, and the moving direction to be a direction toward the first position or the second position that is different from the moving start position.

10. The method of claim 1, further comprising:
    deriving a difference between the in-focus position and the present position;
    determining whether a value obtained by subtracting the difference from a present position of the focus lens is less than the first position; and
    when the value is less than the first position, moving the focus lens from the present position to the second position.

11. The method of claim 10, further comprising:
    when the value is not less than the first position, determining whether the present position is less than a central position between the first position and the second position; and
    when the present position is less than the central position, moving the focus lens from the first position to the second position.

12. The method of claim 11, further comprising, when the present position is not less than the central position, moving the focus lens from the second position to the first position.

13. The method of claim 1, further comprising:
    deriving a difference between the in-focus position and a present position of the focus lens;
    determining whether a value obtained by adding the difference to the present position is greater than the second position; and
    when the value is greater than the second position, moving the focus lens from the present position to the first position.

14. The method of claim 13, further comprising:
    when the value is not greater than the second position, determining whether the present position is greater than a central position between the first position and the second position; and
    when the present position is greater than the central position, moving the focus lens from the second position to the first position.

15. The method of claim 14, further comprising, when the present position is not greater than the central position, moving the focus lens from the first position to the second position.

16. The method of claim 1, further comprising:
    deriving a luminance signal corresponding to a present position of the focus lens; and
    when the luminance signal is greater than a reference value, deriving a relative focus value corresponding to the present position of the focus lens.

17. A non-transitory computer-readable storage medium having embodied thereon a computer program for executing at least the method of claim 1.

18. An apparatus for controlling a focus lens between a first position and a second position, the apparatus comprising:
    a normalized focus graph derivation unit to derive a plurality of relative focus values for respective ones of a plurality of focus lens positions comprising a present position of the focus lens;
    a target position derivation unit to mathematically compute a predicted in-focus position of the focus lens that is focused on a subject from the relative focus values; and
    a focus lens movement control unit to control the focus lens to move directly to the predicted in-focus position.

19. The apparatus of claim 18, further comprising a memory to store the relative focus values.

20. The apparatus of claim 18, wherein each of the relative focus values is a relative value of a first focus value for the respective focus lens position according to a first filter having a first cut-off frequency versus a second focus value for the respective focus lens position according to a second filter having a second cut-off frequency.

21. The apparatus of claim 20, further comprising:
a first focus value derivation unit to derive the first focus value; and
a second focus value derivation unit to derive the second focus value.

22. The apparatus of claim 18, further comprising a moving information determination unit to determine at least one of a moving start position or a moving direction so as to move the focus lens to the in-focus position.

23. The apparatus of claim 22, wherein the moving information determination unit comprises:
a first determination unit to determine whether the in-focus position is positioned between the first position and the second position;
a moving start position determination unit to determine a moving start position to be the present position, when the in-focus position is positioned between the first position and the second position; and
a moving direction determination unit to determine a moving direction to be a direction toward the in-focus position, when the in-focus position is positioned between the first position and the second position.

24. An apparatus for controlling a focus lens between a first position and a second position, the apparatus comprising:
a relative focus value derivation unit to derive a relative focus value for a present position of the focus lens;
a normalized focus graph derivation unit to derive at least one normalized focus graph comprising the present position of the focus lens and the relative focus value;
a target position derivation unit to derive a target position of the focus lens that is focused on a subject from the normalized focus graph;
a focus lens movement control unit to control the focus lens to be moved to the target position; and
a moving information determination unit to determine at least one of a moving start position or a moving direction so as to move the focus lens to the target position, the moving information determination unit comprising:
a first determination unit to determine whether the target position is positioned between the first position and the second position;
a moving start position determination unit to determine a moving start position to be the present position, when the target position is positioned between the first position and the second position;
a moving direction determination unit to determine a moving direction to be a direction toward the target position, when the target position is positioned between the first position and the second position; and
a second determination unit to determine whether the present position substantially corresponds to a central position between the first position and the second position, wherein
when the target position is not positioned between the first position and the second position, and when the present position does not substantially correspond to the central position, the moving start position determination unit is to determine the moving start position to be the first position or the second position that is closest to the present position; and
when the target position is not positioned between the first position and the second position, and when the present position does not substantially correspond to the central position, the moving direction determination unit is to determine the moving direction to be a direction toward the first position or the second position that is different from the moving start position.

25. An apparatus for controlling a focus lens between a first position and a second position, the apparatus comprising:
a relative focus value derivation unit to derive a relative focus value for a present position of the focus lens;
a normalized focus graph derivation unit to derive at least one normalized focus graph comprising the present position of the focus lens and the relative focus value;
a target position derivation unit to derive a target position of the focus lens that is focused on a subject from the normalized focus graph;
a focus lens movement control unit to control the focus lens to be moved to the target position; and
a moving information determination unit to determine at least one of a moving start position or a moving direction so as to move the focus lens to the target position, the moving information determination unit comprising:
a difference derivation unit to compute a difference between the target position and the present position;
a first determination unit to determine whether a value obtained by adding the difference to the present position is less than the first position;
a moving start position determination unit to determine a moving start position of the focus lens to be the present position, when the value is less than the first position; and
a moving direction determination unit to determine a moving direction of the focus lens to be a direction toward the second position, when the value is less than the first position.

26. The apparatus of claim 25, further comprising a second determination unit to determine whether the present position is less than a central position between the first position and the second position, wherein:
the moving start position determination unit is to determine the first position as the moving start position of the focus lens, and the moving direction determination unit is to determine the second position as the moving direction of the focus lens, when the value is not less than the first position, and when the present position is less than the central position; and
the moving start position determination unit is to determine the second position as the moving start position of the focus lens, and the moving direction determination unit is to determine a direction toward the first position as the moving direction of the focus lens, when the value is not less than the first position, and when the present is not less than the central position.

27. The apparatus of claim 18, further comprising a luminance deviation derivation unit to derive a deviation of a luminance signal for the present position of the focus lens.

28. The apparatus of claim 27, further comprising a luminance deviation determination unit to compare the deviation of the luminance signal with a reference value.

29. The apparatus of claim 28, wherein, when the deviation of the luminance signal is greater than the reference value, the luminance deviation determination unit is to output a control signal for controlling the relative focus value derivation unit to derive the relative focus value for the present position of the focus lens.

* * * * *